(12) United States Patent
Chern et al.

(10) Patent No.: US 10,359,689 B2
(45) Date of Patent: Jul. 23, 2019

(54) FLASHLIGHT DEVICE

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: Everready Precision Ind. Corp., Kaohsiung (TW)

( * ) Notice: Subject to any disclaimer, the term of this patent is extended or adjusted under 35 U.S.C. 154(b) by 0 days.

(21) Appl. No.: 14/971,565

(22) Filed: Dec. 16, 2015

(65) Prior Publication Data
US 2016/0349598 A1    Dec. 1, 2016

(30) Foreign Application Priority Data

| May 29, 2015 | (CN) | 2015 1 0288678 |
| May 29, 2015 | (TW) | 104117464 A |
| Oct. 30, 2015 | (CN) | 2015 1 0729206 |
| Oct. 30, 2015 | (TW) | 104135811 A |

(51) Int. Cl.
*G03B 15/05* (2006.01)

(52) U.S. Cl.
CPC ...... *G03B 15/05* (2013.01); *G03B 2215/0567* (2013.01); *G03B 2215/0592* (2013.01)

(58) Field of Classification Search
CPC ............ G03B 15/05; G03B 2215/0592; G03B 2215/0567; H04N 5/23293
USPC ...................................................... 396/281
See application file for complete search history.

(56) References Cited

U.S. PATENT DOCUMENTS

| 5,477,292 A | 12/1995 | Kanai et al. | |
| 7,519,287 B2 * | 4/2009 | Mok | G02B 27/0944 348/371 |
| 2002/0025157 A1 * | 2/2002 | Kawakami | G03B 15/05 396/155 |
| 2002/0180659 A1 * | 12/2002 | Takahashi | G02B 27/225 345/4 |
| 2010/0178046 A1 * | 7/2010 | Moon | F21L 4/02 396/155 |
| 2010/0309369 A1 * | 12/2010 | Jarvis | H04N 5/2254 348/371 |
| 2011/0123184 A1 * | 5/2011 | Mather | H04N 5/2256 396/176 |
| 2012/0018322 A1 | 1/2012 | Mongan et al. | |
| 2012/0176801 A1 | 7/2012 | You | |
| 2014/0176767 A1 * | 6/2014 | Hamel | H04N 5/23296 348/240.2 |
| 2014/0226299 A1 | 8/2014 | You et al. | |
| 2014/0340573 A1 * | 11/2014 | Clawson | H04N 5/2256 348/371 |

(Continued)

*Primary Examiner* — Donald L Raleigh
(74) *Attorney, Agent, or Firm* — Muncy, Geissler, Olds & Lowe, P.C.

(57) ABSTRACT

A flashlight device includes a light source and a flash lens. A microstructure film with a microstructure pattern is disposed on the flash lens. After plural light beams from the light source pass through the flash lens and the microstructure film, a flash of light is provided to an environment. The plural light beams are shaped by the at least one microstructure film while the plural light beams pass through the microstructure film, and/or a spectrum distribution of the plural light beams is modulated after the plural light beams pass through the microstructure film.

6 Claims, 12 Drawing Sheets

(56) References Cited

U.S. PATENT DOCUMENTS

| | | | |
|---|---|---|---|
| 2014/0347555 A1* | 11/2014 | Hirakata | G03B 15/03 348/371 |
| 2015/0124478 A1* | 5/2015 | Ohkawa | G02B 6/0091 362/606 |
| 2016/0337564 A1* | 11/2016 | Fournier | F21V 14/003 |

* cited by examiner

FLASHLIGHT DEVICE

FIELD OF THE INVENTION

The present invention relates to an optical apparatus, and more particularly to an optical apparatus for a flashlight device.

BACKGROUND OF THE INVENTION

With the development of information technologies, people are highly dependent on electronic devices. For meeting the requirements of high speed, high performance and small size, portable electronic devices with a camera function become the mainstream of the modern electronic products and become the indispensable tools of the modern lives. Consequently, the applications of various image pickup devices (e.g., conventional cameras, digital cameras or mobile phones with an imaging function) are gradually expanded. For enhancing the imaging function, the image pickup device is usually equipped with a flashlight device. While the image pickup device is used in photography, the flashlight device produces a flash of artificial light to help illuminate an environment. Consequently, the captured image is more shape.

FIG. 1 is a schematic view illustrating the structure of a conventional flashlight device. As shown in FIG. 1, the flashlight device 1 comprises a flash lens 12 and a light source 11. For example, the light source 11 is a light emitting diode. The light source 11 provides light beams L1. The flash lens 12 has a saw-toothed structure 121 that faces the light source 11. After the light beams L1 from the light source 11 pass through the flash lens 12, the light beams L1 are outputted from the flash lens 12. Since the travelling direction of the light beams L1 is changed by the saw-toothed structure 121, the outputted light beams L1* are diffused to fill light to the environment.

However, the efficacy of filling light by the conventional flashlight device 1 is usually unsatisfied because the light beams L1* outputted from the flash lens 12 are not uniformly diffused and the brightness values in various positions of the environment are not completely identical. For solving these drawbacks, many technologies have been disclosed. For example, US Patent Publication No. US2012/0176801 and US Patent Publication No. 2014-0226299 disclose the technologies of uniformly outputting the light beam of the light source by changing the structure of the flash lens. Due to the limitation of the outer appearance of the flash lens, the excessively-curved surfaces cannot be used. Nowadays, the trend of designing the flashlight device is toward the combination of the flash lens and an associated mechanism. Under this circumstance, the mechanism to be combined with the flash lens should have a supporting surface corresponding to the flash lens. Because of the supporting surface, the lighting surface of the flash lens is limited. If the lighting surface of the flash lens is not limited, the flash lens cannot be combined with the mechanism. That is, because of the demands on the outer appearance and the mechanical strength and the limitation of the producing process, the flash lens with the changed structure is not satisfied and usually detrimental to competiveness or mass production. Moreover, since the thickness of the flash lens is not effectively reduced, the flashlight device cannot meet the requirements of small size, light weightiness and easy portability.

Moreover, US Patent Publication No. US2012/0018322 discloses a technology of increasing the light uniformity by installing an optical diffusion structure on an outer case (e.g., a mobile phone case) at a position corresponding to the flash lens. However, due to the limitation of the producing process, the precision of the outer case cannot match the flash lens. Moreover, U.S. Pat. No. 5,477,292 discloses a method of increasing the uniformity of the outputted light beams by installing a slidable diffusion plate in front of the flashlight device. However, the complexity of the mechanism and the overall thickness of the flashlight device are increased.

Moreover, as the demands on the imaging quality gradually increase, the color (i.e., the color temperature) of the image captured by the image pickup device should be as vivid as possible. Consequently, the user is fastidious about the fidelity of the color temperature of the flashlight device. Moreover, since the flashlight device 1 as shown in FIG. 1 only has a single light source to generate a flash of light (i.e., a single flash), the color saturation of filling light to the environment by the flashing device is usually insufficient and the color temperature fails to be adjusted. For solving these drawbacks, another conventional flashlight device is further equipped with a second light source (i.e., a twin flash) or even a third light source (i.e., a triple flash). However, since plural light sources of the flashlight device do not have the same lighting center, it is an issue of providing a method of uniformity outputting the light beams while mixing the color temperatures and mixing the optical intensities.

Moreover, the blue light contained in the light source of the conventional flashlight device, for example a light emitting diode (LED), accounts for a greater fraction of the light spectrum. Since the blue light is usually not acceptable to many users or the environment, it is also an important issue to convert a portion of the blue light into the acceptable light.

From the above discussions, the conventional flashlight device needs to be further improved.

SUMMARY OF THE INVENTION

An object of the present invention provides a flashlight device. A flash lens of the flashlight device has a microstructure film with a microstructure pattern. According to the microstructure pattern of the microstructure film, the flash of light outputted from the flashlight device can be diffused uniformly and/or the beam shape, the direction, the beam diffusion angle, intensity or the spectrum distribution of the flash of light provided by the flashlight device can be flexibly designed.

In accordance with an aspect of the present invention, there is provided a flashlight device. The flashlight device includes at least one light source and a flash lens. The at least one light source provide plural light beams. At least one microstructure film is disposed on the flash lens. After the plural light beams pass through the flash lens, the plural light beams are outputted to illuminate an environment. The plural light beams are shaped by the at least one microstructure film while the plural light beams pass through the at least one microstructure film, and/or a spectrum distribution of the plural light beams is modulated after the plural light beams pass through the at least one microstructure film.

In an embodiment, the at least one light source includes a laser diode (LD), a light emitting diode (LED), an organic light emitting diode (OLED) and/or a thermal source.

In an embodiment, the at least one light source includes a light emitting diode and a laser diode. The at least one microstructure film includes a first microstructure film corresponding to the light emitting diode and a second microstructure film corresponding to the laser diode. After the light beams provided by the light emitting diode pass through the first microstructure film, a flash of light is outputted. After the light beams provided by the laser diode pass through the second microstructure film, a structured light is generated.

In an embodiment, the at least one light source includes plural light emitting diodes, and the at least one microstructure film is a single microstructure film. After the light beams provided by the plural light emitting diodes pass through the single microstructure film, a flash of light is outputted.

In an embodiment, the at least one light source includes plural light emitting diodes, and the at least one microstructure film includes plural microstructure films corresponding to the plural light emitting diodes. After the light beams provided by the plural light emitting diodes pass through the corresponding microstructure films, a flash of light is outputted.

In an embodiment, the flash lens is arranged between the at least one microstructure film and the at least one light source, or the at least one microstructure film is arranged between the flash lens and the at least one light source, or the at least one microstructure film is embedded within the flash lens.

In an embodiment, the at least one microstructure film includes a diffractive optical element (DOE), or the at least one microstructure film has a Fresnel surface.

In an embodiment, the at least one microstructure film is fixed on the flash lens through a fixing medium. A refractive index of the fixing medium is in a range between a refractive index of the flash lens and a refractive index of the at least one microstructure film.

In an embodiment, the at least one microstructure film is made of a plastic material, a silicone material, a glass material or an ultraviolet curable material.

In an embodiment, the at least one microstructure film further contains a wavelength-sensitive material. The spectrum distribution of the light beams outputted from the at least one microstructure film is modulated by the wavelength-sensitive material.

In an embodiment, the wavelength-sensitive material is a fluorescent material.

In an embodiment, the at least one microstructure film has an asymmetric profile, or a profile of the at least one microstructure film is coaxial with a lighting center of the light source.

In an embodiment, the at least one microstructure film is a stack structure including plural layers of microstructure patterns.

In an embodiment, a surface of the at least one microstructure film to be coupled with the flash lens is a curved surface, and/or a surface of the flash lens to be coupled with the at least one microstructure film is a curved surface.

In an embodiment, the largest distance between the at least one microstructure film and a lighting center of the at least one light source is not larger than 6 mm.

In an embodiment, a thickness of the flashlight device is not larger than 6 mm.

In an embodiment, the flashlight device includes at least one sensing element. The at least one sensing element is located at a first side of the flash lens. In addition, plural light beams coining from a second side of the flash lens and passing through the flash lens are sensed by the at least one sensing element.

In an embodiment, the flashlight device further includes at least one sensing element. The at least one sensing element is located at a side of the flash lens. In addition, plural light beams coining from the side of the flash lens are sensed by the at least one sensing element.

In an embodiment, the at least one light source is also located at the side of the flash lens, or the at least one light source is not located at the side of the flash lens.

In an embodiment, the flashlight device further includes at least one sensing element. The at least one sensing element is embedded within the at least one microstructure film. In addition, plural light beams introduced into the at least one microstructure film are sensed by the at least one sensing element.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
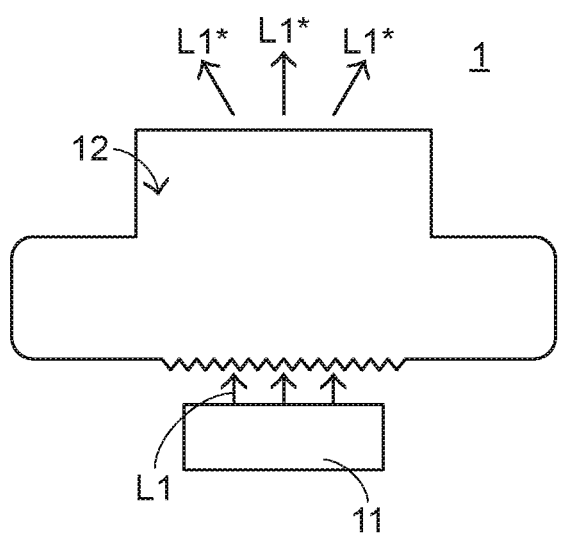
FIG. 1 is a schematic view illustrating the structure of a conventional flashlight device.
Figure 2A:
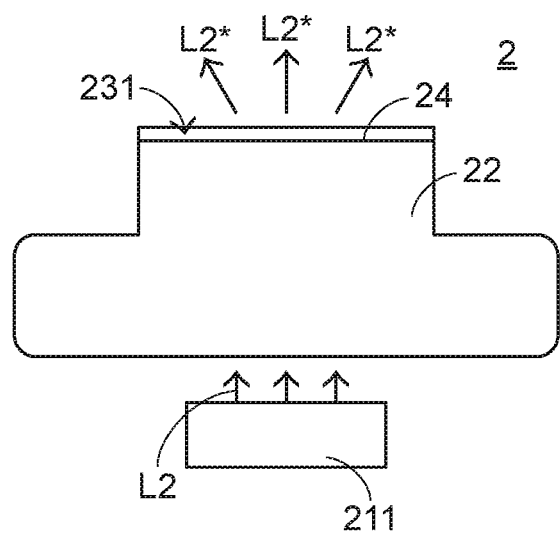
FIG. 2A is a schematic view illustrating the structure of a flashlight device according to a first embodiment of the present invention.
Figure 2B:
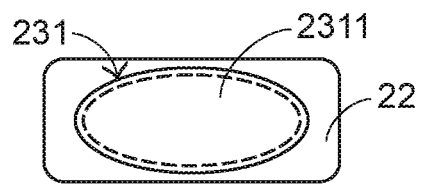
FIG. 2B is a schematic top view illustrating the flashlight device of FIG. 2A.

FIG. 2A is a schematic view illustrating the structure of a flashlight device according to a first embodiment of the present invention. FIG. 2B is a schematic top view illustrating the flashlight device of FIG. 2A. The flashlight device 2 comprises a light source 211 and a flash lens 22. The flash lens 22 is disposed over the light source 211. Moreover, a microstructure film 231 is disposed on the flash lens 22. The light source 211 provides plural light beams L2. After these light beams L2 pass through the flash lens 22 and the microstructure film 231 sequentially, a flash of light is produced to the environment. That is, the flash of light illuminates the environment during the imaging process or the sensing process.

An example of the light source 211 includes but is not a single light emitting diode. For example, the light source 211 includes a laser diode (LD), a light emitting diode (LED), an organic light emitting diode (OLED), a thermal source or any other comparable semiconductor-type light-emitting element similar to the laser diode, the light emitting diode or the organic light emitting diode.

Moreover, the microstructure film 231 has a microstructure pattern 2311. While the plural light beams L2 pass through the microstructure film 231, the plural light beams L2 are shaped. After the plural light beams L2 pass through the microstructure film 231, the beam diffusion angle and/or the intensity of the outputted light beams L2* are modulated. Consequently, the outputted light beams L2* can be flexibly adjusted. For example, according to the design of the microstructure pattern 2311, the outputted light beams L2* are scattered in a wider range (i.e., more convergent), scattered in a narrower region (i.e., more divergent) or diffused more uniformly. Moreover, according to the design of the microstructure pattern 2311, the flashlight device 2 provides a flash of light along a specified direction. Alternatively, a spectrum distribution of the outputted light beams L2* is modulated by the microstructure film 231. For example, while the light beams L2 pass through the microstructure pattern 2311, the light beams L2 are split by the microstructure pattern 2311. Consequently, only portions of the light beams in a specified wavelength range are outputted from the microstructure film 231. The method of designing the microstructure pattern 2311 and outputting the light beams L2* through the microstructure pattern 2311 is well known to those skilled in the art, and is not redundantly described herein.

An example of the microstructure film 231 includes a diffractive optical element (DOE) or a thin film with a Fresnel surface. Alternatively, the microstructure film 231 is a stack structure including plural layers of microstructure patterns 2311. Moreover, the microstructure film 231 is made of a plastic material, a glass material, a silicone material or an ultraviolet (UV) curable material. For example, the plastic material is polycarbonate (PC), poly (methyl methacrylate) (PMMA) or Zeonex, and the glass material is a BK7 glass material.

Figure 3A:
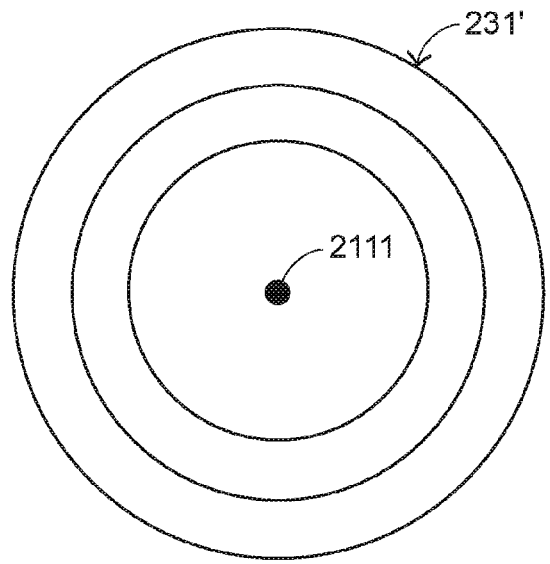
FIG. 3A schematically illustrates an exemplary relationship between the profile of the microstructure film and a lighting center of the light source for the flashlight device FIG. 2A.

FIG. 3A schematically illustrates an exemplary relationship between the profile of the microstructure film and a lighting center of the light source for the flashlight device FIG. 2A. In FIG. 3A, the profile of the microstructure film 231' is coaxial with a lighting center 2111 of the light source 211. Preferably but not exclusively, the largest distance between the microstructure film 231' and the lighting center 2111 of the light source 211 is not larger than 6 mm. In practice, according to the type of the light source (e.g., a laser diode or a light emitting diode), the application, the environment requiring the flash of light or the position of the light source 211, the profile of the microstructure film can be altered.

Figure 3B:
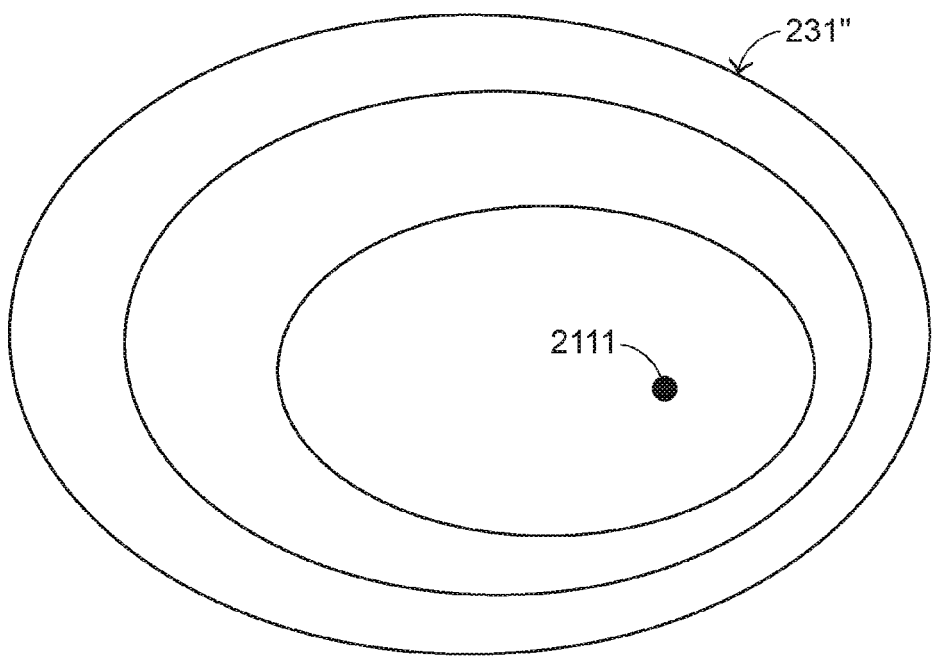
FIG. 3B schematically illustrates another exemplary relationship between the profile of the microstructure film and a lighting center of the light source for the flashlight device FIG. 2A.

FIG. 3B schematically illustrates another exemplary relationship between the profile of the microstructure film and a lighting center of the light source for the flashlight device FIG. 2A. In FIG. 3B, the microstructure film 231" has an asymmetric profile according to the practical requirements. It is noted that the profiles of the microstructure films 231' and 231" may be varied according to the practical requirements.

Please refer to FIG. 2A again. In this embodiment, the microstructure film 231 is fixed on the flash lens 22 through a fixing medium 24. The refractive index of the fixing medium 24 is in the range between the refractive index of the flash lens 22 and the refractive index of the microstructure film 231. Consequently, while the light beams L2 pass through the fixing medium 24, the undesired reflection or the random refraction of the light beams L2 is reduced. In this embodiment, the fixing medium 24 for fixing the microstructure film 231 is a light-transmissible adhesive.

Moreover, the surface of the microstructure film 231 to be coupled with the flash lens 22 and the surface of the flash lens 22 to be coupled with the microstructure film 231 may have any profiles such as curved surfaces. Consequently, the flashlight device 2 can be designed more flexibly. For example, the outputted light beams L2* are scattered in a wider range (i.e., more convergent), scattered in a narrower region (i.e., more divergent) or diffused more uniformly. In an embodiment, the surface of the flash lens 22 to be coupled with the microstructure film 231 is marked with an alignment mark. According to the alignment mark, the microstructure film 231 can be fixed (e.g., adhered) on a proper position of the flash lens 22 by the assembler more conveniently.

Figure 4A:
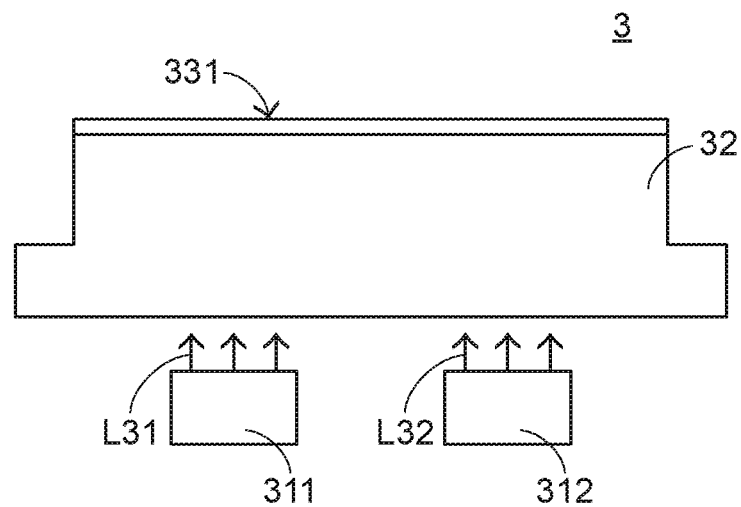
FIG. 4A is a schematic view illustrating the structure of a flashlight device according to a second embodiment of the present invention.
Figure 4B:
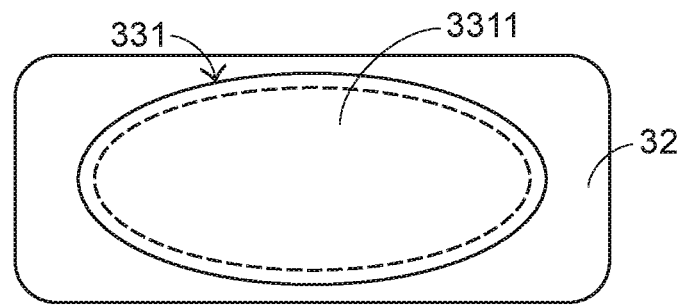
FIG. 4B is a schematic top view illustrating the flashlight device of FIG. 4A.

FIG. 4A is a schematic view illustrating the structure of a flashlight device according to a second embodiment of the present invention. FIG. 4B is a schematic top view illustrating the flashlight device of FIG. 4A. The components of the flashlight device 3 of this embodiment that are similar to those of the first embodiment are not redundantly described herein. In comparison with the first embodiment, the flashlight device 3 of this embodiment comprises a first light source 311 and a second light source 312. Both of the first light source 311 and the second light source 312 are light emitting diodes. Moreover, a single microstructure film 331 is shared by the first light source 311 and the second light source 312. After the light beams L31 from the first light source 311 and the light beams L32 from the second light source 312 pass through the flash lens 32 and the same microstructure film 331, modulated light beams are outputted from the flashlight device 3. Moreover, the microstructure pattern 3311 of the single microstructure film 331 may be altered according to the practical requirements. In comparison with the flashlight device 2, a flash of light with stronger intensity is provided to the environment requiring the flash light.

Figure 5A:
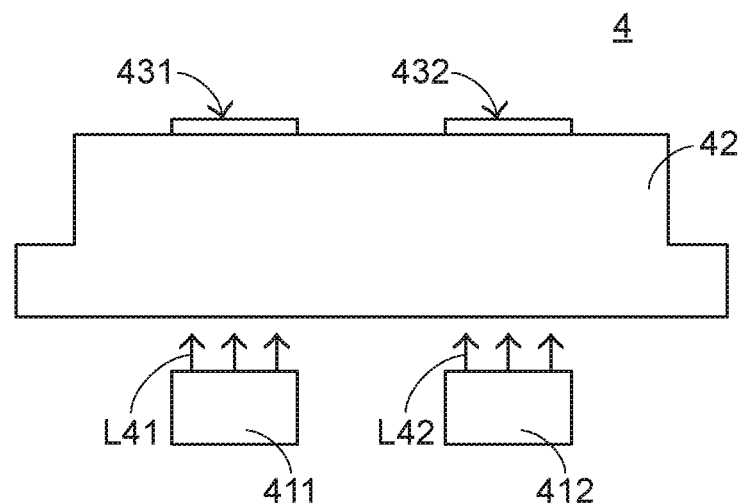
FIG. 5A is a schematic view illustrating the structure of a flashlight device according to a third embodiment of the present invention.
Figure 5B:
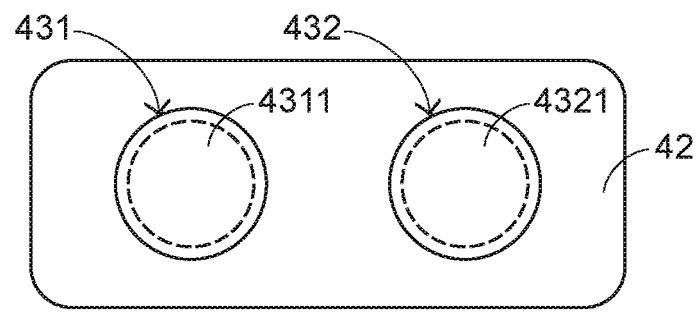
FIG. 5B is a schematic top view illustrating the flashlight device of FIG. 5A.

FIG. 5A is a schematic view illustrating the structure of a flashlight device according to a third embodiment of the present invention. FIG. 5B is a schematic top view illustrating the flashlight device of FIG. 5A. The components of the flashlight device 4 of this embodiment that are similar to those of the second embodiment are not redundantly described herein. In comparison with the second embodiment, the flash lens 42 of the flashlight device 4 of this embodiment comprises a first microstructure film 431 and a second microstructure film 432 corresponding to the first light source 411 and the second light source 412, respectively. After the light beams L41 from the first light source 411 pass through the flash lens 42 and the first microstructure film 431 and the light beams L42 from the second light source 412 pass through the flash lens 42 and the second microstructure film 432, modulated light beams are outputted from the flashlight device 4. A first microstructure pattern 4311 of the first microstructure film 431 and a second microstructure pattern 4321 of the second microstructure film 432 are identical or different. Similarly, the microstructure patterns may be altered according to the practical requirements.

Figure 6A:
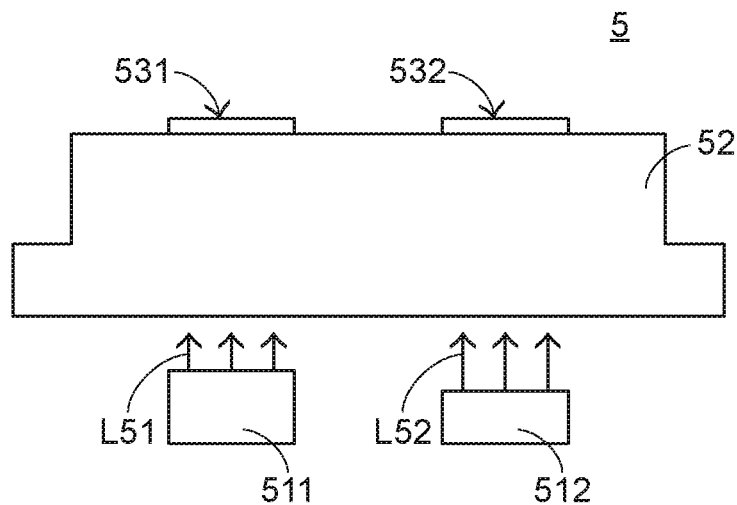
FIG. 6A is a schematic view illustrating the structure of a flashlight device according to a fourth embodiment of the present invention.
Figure 6B:
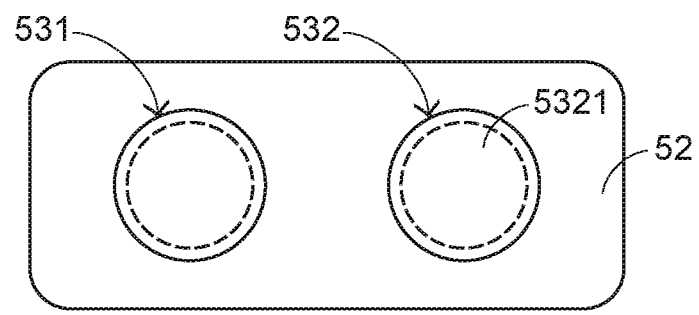
FIG. 6B is a schematic top view illustrating the flashlight device of FIG. 6A.

FIG. 6A is a schematic view illustrating the structure of a flashlight device according to a fourth embodiment of the present invention. FIG. 6B is a schematic top view illustrating the flashlight device of FIG. 6A. The components of the flashlight device 5 of this embodiment that are similar to those of the third embodiment are not redundantly described herein. In comparison with the third embodiment, the first light source 511 and the second light source 512 are a light emitting diode and a laser diode, respectively. After the light beams L51 pass through the flash lens 52 and the first microstructure film 531 sequentially, a flash of light is produced to the environment. After the light beams L52 pass through the flash lens 52 and the second microstructure film 532 sequentially, a structured light corresponding to the a second microstructure pattern 5321 of the second microstructure film 532 is generated. Preferably but not exclusively, the flashlight device 5 of this embodiment can be applied to the motion-sensing and image-capturing filed or applied to the infrared iris recognition filed. The method of designing the second microstructure pattern 5321 and outputting the desired light beams through the second microstructure pattern 5321 is well known to those skilled in the art, and is not redundantly described herein.

Figure 7:
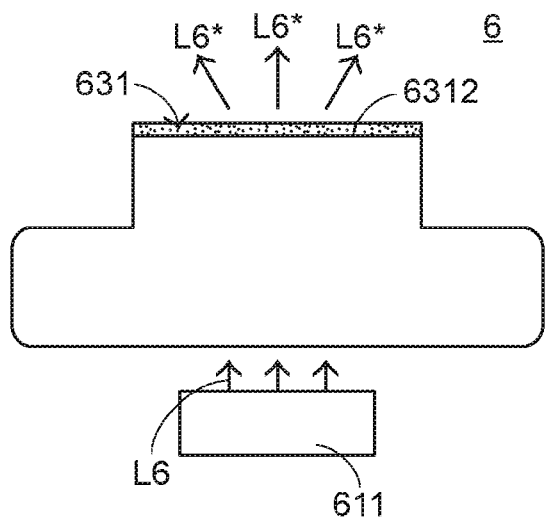
FIG. 7 is a schematic view illustrating the structure of a flashlight device according to a fifth embodiment of the present invention.

FIG. 7 is a schematic view illustrating the structure of a flashlight device according to a fifth embodiment of the present invention. The components of the flashlight device 6 of this embodiment that are similar to those of the first embodiment are not redundantly described herein. In comparison with the first embodiment, the microstructure film 631 further contains a wavelength-sensitive material 6312. The wavelength-sensitive material 6312 is used for modulating a spectrum distribution of the light beams that are outputted from the microstructure film 631.

In this embodiment, the wavelength-sensitive material 6312 is a fluorescent material. When the light beam L6 from the light source 611 is introduced into the microstructure film 631, the light beams in a shorter wavelength range (e.g., blue light beams) are absorbed by the wavelength-sensitive material 631, and thus the light beams in the longer wavelength range are released. Consequently, only the light beams L6* in a specified wavelength is outputted from the microstructure film 631, and a flash of light with a specified color temperature is provided to the environment. It is noted that the wavelength-sensitive material is not restricted to the fluorescent material. That is, the type of the wavelength-sensitive material may be altered according to the practical requirements.

Figure 8:
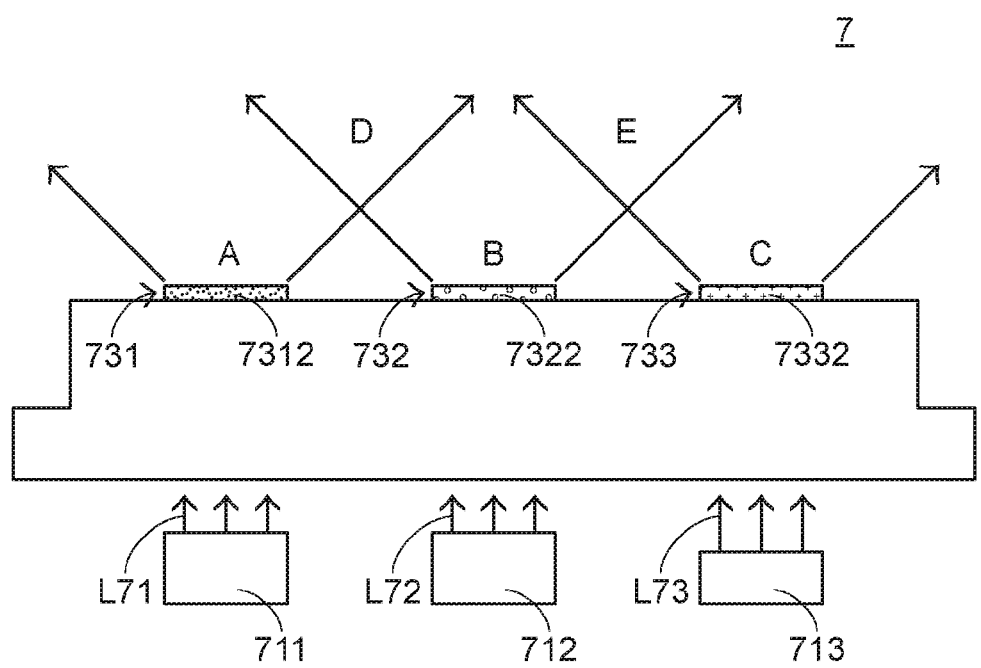
FIG. 8 is a schematic view illustrating the structure of a flashlight device according to a sixth embodiment of the present invention.

FIG. 8 is a schematic view illustrating the structure of a flashlight device according to a sixth embodiment of the present invention. The components of the flashlight device 7 of this embodiment that are similar to those of the fifth embodiment are not redundantly described herein. In comparison with the fifth embodiment, the flashlight device 7 comprises a first light source 711, a second light source 712 and a third light source 713. Moreover, the flash lens 72 of the flashlight device 7 comprises a first microstructure film 731, a second microstructure film 732 and a third microstructure film 733 corresponding to the first light source 711, the second light source 712 and the third light source 713, respectively. The first microstructure film 731, the second microstructure film 732 and the third microstructure film 733 contain a first wavelength-sensitive material 7312, a second wavelength-sensitive material 7322 and a third wavelength-sensitive material 7332, respectively.

After the light beam L71 from the first light source 711 is introduced into the first microstructure film 731, a flash of light with a first color temperature is outputted from the flashlight device 7 to a specified region (e.g., the region A as shown in FIG. 8) of the environment in response to the first wavelength-sensitive material 7312. After the light beam L72 from the second light source 712 is introduced into the second microstructure film 732, a flash of light with a second color temperature is outputted from the flashlight device 7 to a specified region (e.g., the region B as shown in FIG. 8) of the environment in response to the second wavelength-sensitive material 7322. After the light beam L73 from the third light source 713 is introduced into the third microstructure film 733, a flash of light with a third color temperature is outputted from the flashlight device 7 to a specified region (e.g., the region C as shown in FIG. 8) of the environment in response to the third wavelength-sensitive material 7332.

In an embodiment, the first wavelength-sensitive material 7312, the second wavelength-sensitive material 7322 and the third wavelength-sensitive material 7332 are different, and the light beams L71, L72 and L73 are simultaneously provided by the first light source 711, the second light source 712 and the third light source 713. Under this circumstance, the flashlight device 7 further provides the mixed flash of light with the first color temperature and the second color temperature to the overlap region D of the region A and the region B, and further provides the mixed flash of light with the second color temperature and the third color temperature to the overlap region E of the region B and the region C.

The embodiment of FIG. 8 is presented herein for purpose of illustration and description only. Similarly, the beam shape, the beam diffusion angle, the direction and the intensity of the flash of light with the first color temperature are determined according to the microstructure pattern (not shown) of the first microstructure film 731. Similarly, the beam shape, the beam diffusion angle, the direction and the intensity of the flash of light with the second color temperature are determined according to the microstructure pattern (not shown) of the second microstructure film 732. Similarly, the beam shape, the beam diffusion angle, the direction and the intensity of the flash of light with the third color temperature are determined according to the microstructure pattern (not shown) of the third microstructure film 733.

In another embodiment, the outputted light beams have a first intensity after the light beams L71 from the first light source 711 pass through the first microstructure film 731, the outputted light beams have a second intensity after the light beams L72 from the second light source 712 pass through the second microstructure film 732, and the outputted light beams have a third intensity after the light beams L73 from the third light source 713 pass through the third microstructure film 733, wherein the first intensity, the second intensity and the third intensity are different. Under this circumstance, a flash of light with the first intensity is outputted from the flashlight device 7 to the region A of the environment, a flash of light with the second intensity is outputted from the flashlight device 7 to the region B of the environment, a flash of light with the third intensity is outputted from the flashlight device 7 to the region C of the environment, a mixed flash of light with the first intensity and the second intensity is outputted from the flashlight device 7 to the region D of the environment, and a mixed flash of light with the second intensity and the third intensity is outputted from the flashlight device 7 to the region E of the environment.

Figure 9:
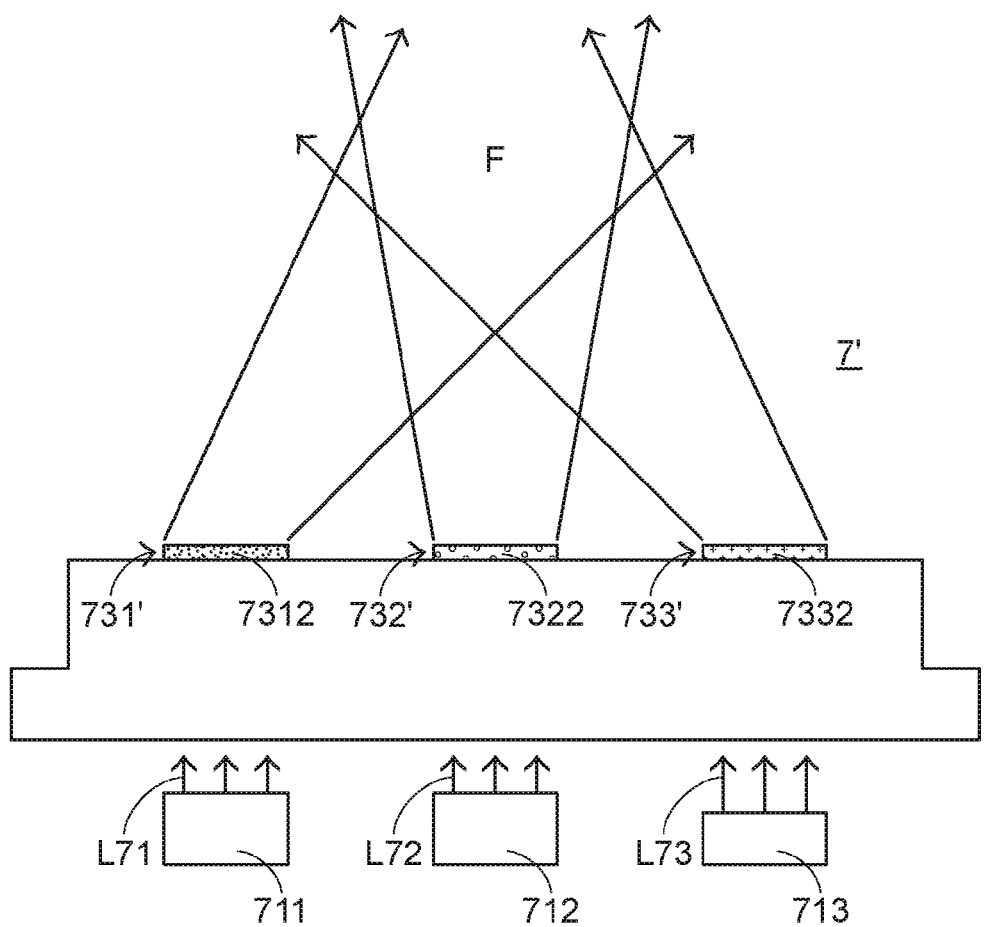
FIG. 9 is a schematic view illustrating the structure of a flashlight device according to a seventh embodiment of the present invention.

FIG. 9 is a schematic view illustrating the structure of a flashlight device according to a seventh embodiment of the present invention. The components of the flashlight device 7' of this embodiment that are similar to those of the sixth embodiment are not redundantly described herein. In comparison with the sixth embodiment, the flash of light with the first color temperature, the flash of light with the second color temperature and the flash of light with the third color temperature are projected along the same temperature according to the microstructure pattern (not shown) of the first microstructure film 731', the microstructure pattern (not shown) of the second microstructure film 732' and the microstructure pattern (not shown) of the third microstructure film 733'. Consequently, a mixed flash of light with the first color temperature, the second color temperature and the third color temperature is outputted from the flashlight device 7' to a specified region (e.g., the region F as shown in FIG. 9) of the environment.

In another embodiment, the outputted light beams have a first intensity after the light beams L71 from the first light source 711 pass through the first microstructure film 731', the outputted light beams have a second intensity after the light beams L72 from the second light source 712 pass through the second microstructure film 732', and the outputted light beams have a third intensity after the light beams L73 from the third light source 713 pass through the third microstructure film 733', wherein the first intensity, the second intensity and the third intensity are different. Under this circumstance, a mixed flash of light with the first intensity, the second intensity and the third intensity is outputted from the flashlight device 7' to the region F of the environment.

Figure 10:
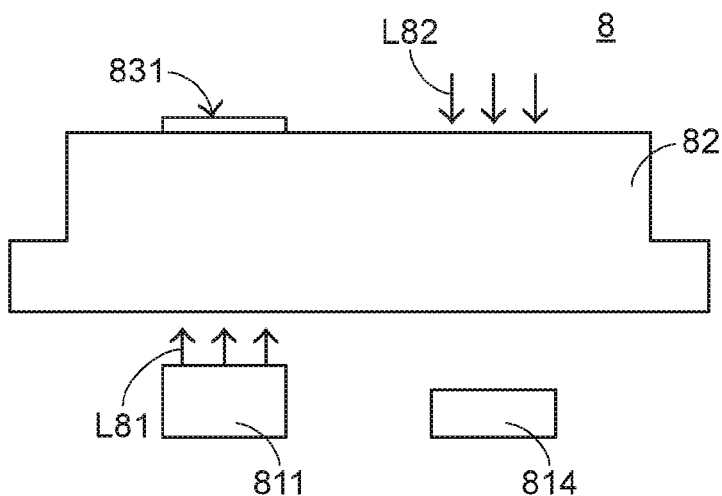
FIG. 10 is a schematic view illustrating the structure of a flashlight device according to an eighth embodiment of the present invention.

FIG. 10 is a schematic view illustrating the structure of a flashlight device according to an eighth embodiment of the present invention. The components of the flashlight device 8 of this embodiment that are similar to those of the first embodiment are not redundantly described herein. In comparison with the first embodiment, the light source 811 and a sensing element 814 are located at a first side of the flash lens 82 of the flashlight device 8. After the light beams L82 from a second side of the flash lens 82 pass through the flash lens 82, the light beams L82 are sensed by the sensing element 814. In an embodiment, the light beams L82 are ambient light beams from the environment of the flashlight device 8 where the flash of light is provided. In another embodiment, the light beams L82 are the reflective light beams from an object (not shown) after the light beams L81 from the light source 811 pass through the flash lens 82 and the microstructure film 831 and are reflected by the object. Consequently, the sensing element 814 can detect the ambient light beams, for example detect the optical intensity and/or the color temperature. It is noted that the source of the light beams L82 and the purpose of the sensing element 814 are not restricted.

Figure 11:
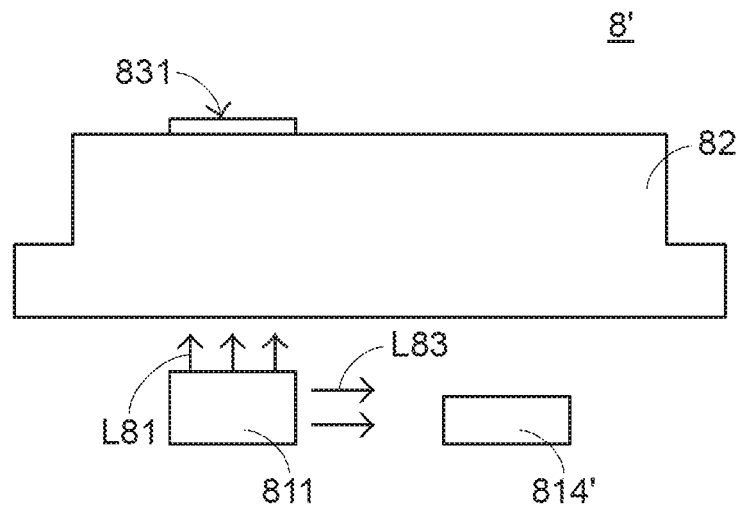
FIG. 11 is a schematic view illustrating the structure of a flashlight device according to a ninth embodiment of the present invention.

FIG. 11 is a schematic view illustrating the structure of a flashlight device according to a ninth embodiment of the present invention. The components of the flashlight device 8' of this embodiment that are similar to those of the eighth embodiment are not redundantly described herein. In comparison with the eighth embodiment, the sensing element 814' is used for sensing the light beams L83 from the light source 811, wherein both of the sensing element 814' and the light source 811 are located at the first side of the flash lens 82.

Figure 12:
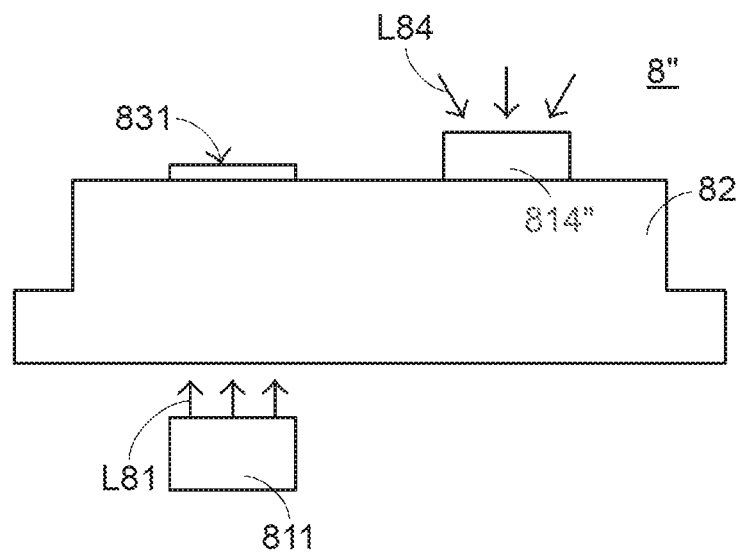
FIG. 12 is a schematic view illustrating the structure of a flashlight device according to a tenth embodiment of the present invention.

FIG. 12 is a schematic view illustrating the structure of a flashlight device according to a tenth embodiment of the present invention. The components of the flashlight device 8" of this embodiment that are similar to those of the eighth embodiment are not redundantly described herein. In comparison with the eighth embodiment, the sensing element 814" is located at the second side of the flash lens 82. That is, the sensing element 814" and the light source 811 are located at opposite sides of the flash lens 82. Consequently, the sensing element 814" is used for sensing the ambient light beams L84 in the environment of the flashlight device 8".

Figure 13:
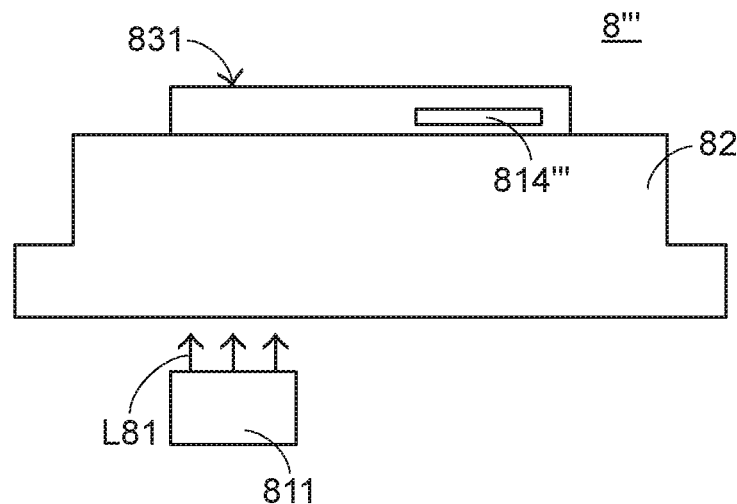
FIG. 13 is a schematic view illustrating the structure of a flashlight device according to an eleventh embodiment of the present invention.
Figure 14A:
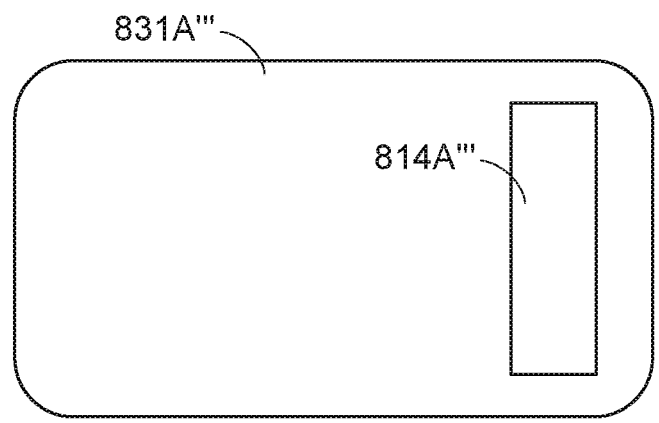
FIG. 14A is a top view illustrating a first example of the microstructure film and the corresponding sensing element used in the flashlight device of FIG. 13.
Figure 14B:
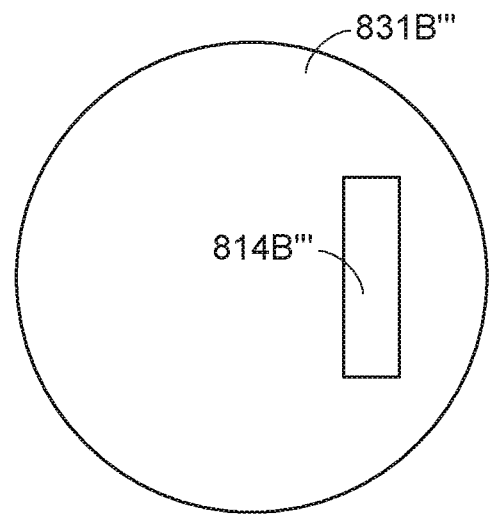
FIG. 14B is a top view illustrating a second example of the microstructure film and the corresponding sensing element used in the flashlight device of FIG. 13.
Figure 14C:
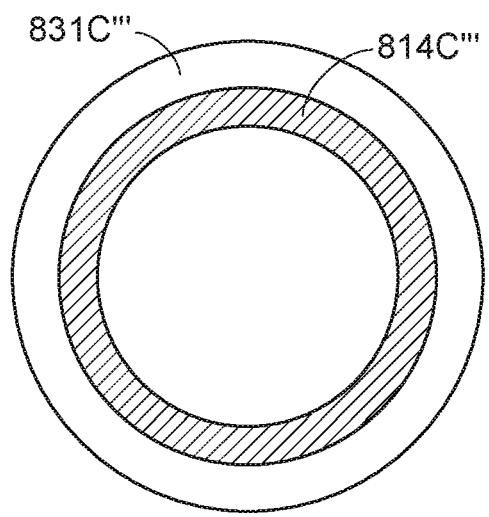
FIG. 14C is a top view illustrating a third example of the microstructure film and the corresponding sensing element used in the flashlight device of FIG. 13.

FIG. 13 is a schematic view illustrating the structure of a flashlight device according to an eleventh embodiment of the present invention. The components of the flashlight device 8''' of this embodiment that are similar to those of the eighth embodiment are not redundantly described herein. In comparison with the eighth embodiment, the sensing element 814''' is embedded within the microstructure film 831'''. The sensing element 814''' is used for sensing the light beams L85 that are introduced into the microstructure film 831'''. FIG. 14A is a top view illustrating a first example of the microstructure film 831A''' and the corresponding sensing element 814A''' used in the flashlight device of FIG. 13. FIG. 14B is a top view illustrating a second example of the microstructure film 831B''' and the corresponding sensing element 814B''' used in the flashlight device of FIG. 13. FIG. 14C is a top view illustrating a third example of the microstructure film 831C''' and the corresponding sensing element 814C''' used in the flashlight device of FIG. 13. These examples are presented herein for purpose of illustration and description only.

Figure 15:
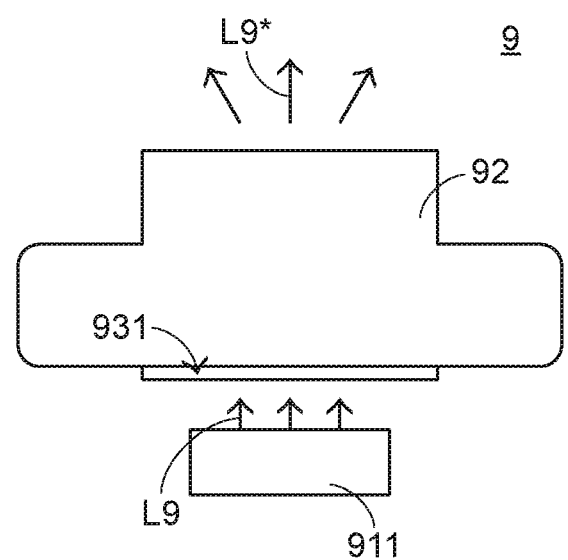
FIG. 15 is a schematic view illustrating the structure of a flashlight device according to a twelfth embodiment of the present invention.

FIG. 15 is a schematic view illustrating the structure of a flashlight device according to a twelfth embodiment of the present invention. The components of the flashlight device 9 of this embodiment that are similar to those of the first embodiment are not redundantly described herein. In comparison with the first embodiment, the microstructure film 931 is arranged between the flash lens 92 and the light source 931. After the plural light beams 9 from the light source 911 pass through the microstructure film 931 and the flash lens 92 sequentially, the light beams L9* are outputted from the flashlight device 9. Consequently, a flash of light is provided to the environment. It is noted that the position of the microstructure film 931 is not restricted to position as described in the first embodiment or the present invention.

That is, the microstructure film 931 may be located at a proper position of the flash memory 92. For example, the microstructure film is embedded within the flash lens.

In the embodiments from the second embodiment to the eleventh embodiment (i.e., FIG. 4A~FIG. 13), the microstructure films are all located at the outsides of the corresponding flash lens. That is, the flash lens is arranged between the microstructure film and the light source. It is noted that numerous modifications and alterations may be made while retaining the teachings of the invention. For example, like the twelfth embodiment, the microstructure film is arranged between the flash lens and the light source. Alternatively, the microstructure film is embedded within the flash lens.

From the above descriptions, the present invention provides the flashlight device. The flash lens of the flashlight device has a microstructure film with a microstructure pattern. The beam shape, the direction, the beam diffusion angle, intensity or the spectrum distribution of the flash of light provided by the flashlight device can be flexibly designed according to the microstructure pattern of the microstructure film. Moreover, since the flash of light outputted from the flashlight device can be diffused uniformly, ambient brightness of the environment can be uniformly distributed. Especially, since the microstructure film is disposed on the flash lens in a simple manner (e.g., by an adhering means), the flashlight device of the present invention is suitable for mass production because it is not necessary to change the structure of the flash lens. In other words, the drawbacks of the conventional technologies can be overcome. Moreover, since the thickness of the microstructure film is smaller than 0.3 mm, the overall thickness of the flashlight device is effectively reduced. Preferably but not exclusively, the maximum thickness of the flashlight device including a circuit board (not shown) where the light source is mounted is not larger than 6 mm.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A flashlight device, comprising:
   at least one light source providing plural light beams and comprising a light emitting diode and a laser diode;
   a flash lens and at least one microstructure film disposed on the flash lens, wherein the at least one microstructure film comprises a first microstructure film corresponding to the light emitting diode and a second microstructure film corresponding to the laser diode, and wherein the at least one microstructure film shapes the plural light beams, modulate a spectrum distribution of the plural light beams, or both modulates the spectrum distribution of the plural light beams and shapes the plural light beams, and wherein a flash of light is outputted after the light beams from the light emitting diode pass through the first microstructure film, and a structured light is generated after the light beams from the laser diode pass through the second microstructure film, wherein the second microstructure film is a diffractive optical element (DOE); and
   at least one sensing element embedded within the at least one microstructure film.

2. The flashlight device according to claim 1, wherein the at least one microstructure film is made of a plastic material, a silicone material, a glass material or an ultraviolet curable material.

3. The flashlight device according to claim 1, wherein the second microstructure film is a stack structure including plural layers of microstructure patterns.

4. A flashlight device, comprising:
   at least one light source providing plural light beams and comprising a light emitting diode and a laser diode;
   a flash lens and at least one microstructure film disposed on the flash lens, wherein the at least one microstructure film shapes the plural light beams, modulate a spectrum distribution of the plural light beams, or both modulates the spectrum distribution of the plural light beams and shapes the plural light beams; and
   at least one sensing element embedded within the at least one microstructure film, wherein the plural light beams introduced into the at least one microstructure film are sensed by the at least one sensing element.

5. A flashlight device, comprising:
   plural separating light sources providing plural light beams;
   a flash lens and plural separating microstructure films disposed on the flash lens, each one of the plural microstructure films positioned corresponding to each one of the plural light sources, wherein the plural microstructure films shape the plural light beams, modulate a spectrum distribution of the plural light beams, or both shape the plural light beams and modulate the spectrum distribution of the plural light beams, wherein at least one of the plural microstructure films is a diffractive optical element (DOE); and
   at least one sensing element embedded within at least one of the plural separating microstructure films.

6. The flashlight device according to claim 5, wherein the at least one of the plural microstructure films is a stack structure including plural layers of microstructure patterns.

* * * * *